(12) United States Patent
Chick

(10) Patent No.: US 7,000,897 B2
(45) Date of Patent: Feb. 21, 2006

(54) APPARATUS AND METHOD FOR OPERATING A WATER VALVE

(75) Inventor: Jon Chick, Shelbyville, TN (US)

(73) Assignee: Chick Tool Company, Inc, Shelbyville, TN (US)

( * ) Notice: Subject to any disclaimer, the term of this patent is extended or adjusted under 35 U.S.C. 154(b) by 61 days.

(21) Appl. No.: 10/816,743

(22) Filed: Apr. 2, 2004

(65) Prior Publication Data
US 2005/0218366 A1 Oct. 6, 2005

(51) Int. Cl.
B25B 21/00 (2006.01)
(52) U.S. Cl. .................. 251/293; 81/177.8; 81/177.6; 81/177.7
(58) Field of Classification Search ............. 81/177.1, 81/177.2, 177.6, 177.7, 124.4, 124.5; 251/293
See application file for complete search history.

(56) References Cited

U.S. PATENT DOCUMENTS

| | | | |
|---|---|---|---|
| 1,181,565 A * | 5/1916 | Block .................. 81/124.2 |
| 1,426,809 A * | 8/1922 | Bate ..................... 74/547 |
| 2,054,978 A * | 9/1936 | Hoelscher ................ 403/306 |
| 2,116,770 A | 5/1938 | Scillia |
| 3,086,414 A | 4/1963 | Nardi |
| 4,334,443 A | 6/1982 | Pearson |
| 4,348,922 A | 9/1982 | Harris et al. |
| 4,546,679 A | 10/1985 | Burghardt |
| 4,573,378 A | 3/1986 | McDonald |
| 4,848,194 A | 7/1989 | Santorineos et al. |
| 5,044,192 A | 9/1991 | Sanmiya |
| 5,193,419 A | 3/1993 | Lee |
| D347,982 S | 6/1994 | Perez |
| D370,606 S | 6/1996 | Cole et al. |
| 5,671,643 A | 9/1997 | Henkhaus |
| 6,364,285 B1 * | 4/2002 | Stinnett .................. 251/293 |
| D472,777 S | 4/2003 | Halstead |
| 6,776,068 B1 * | 8/2004 | Reuschel et al. ............. 81/54 |
| 6,837,481 B1 * | 1/2005 | Corral .................... 251/293 |
| 6,898,998 B1 * | 5/2005 | Shyu .................... 81/63.1 |

* cited by examiner

Primary Examiner—J. Casimer Jacyna
(74) Attorney, Agent, or Firm—James Richards

(57) ABSTRACT

A valve wrench comprising a telescoping shaft assembly further comprising an inner shaft and an outer shaft, a handle pivotally attached to a first end of the shaft assembly, and a work coupling element fixed or mounted on a second end. The inner shaft may include a spring loaded button that engages the outer shaft to hold the inner and outer shaft in an operation position or alternatively in a storage position. The handle pivots to form a compact linear assembly in a storage configuration and is shaped conformal to the telescoping shaft to minimize occupied space in the storage configuration. The inner and outer shafts may be constructed from a number of complementary cross section shapes including rectangular, hexagonal, and spline to assist in the transfer of torque from the handle to the valve. A number of alternative valve coupling elements are provided for different valves.

15 Claims, 10 Drawing Sheets

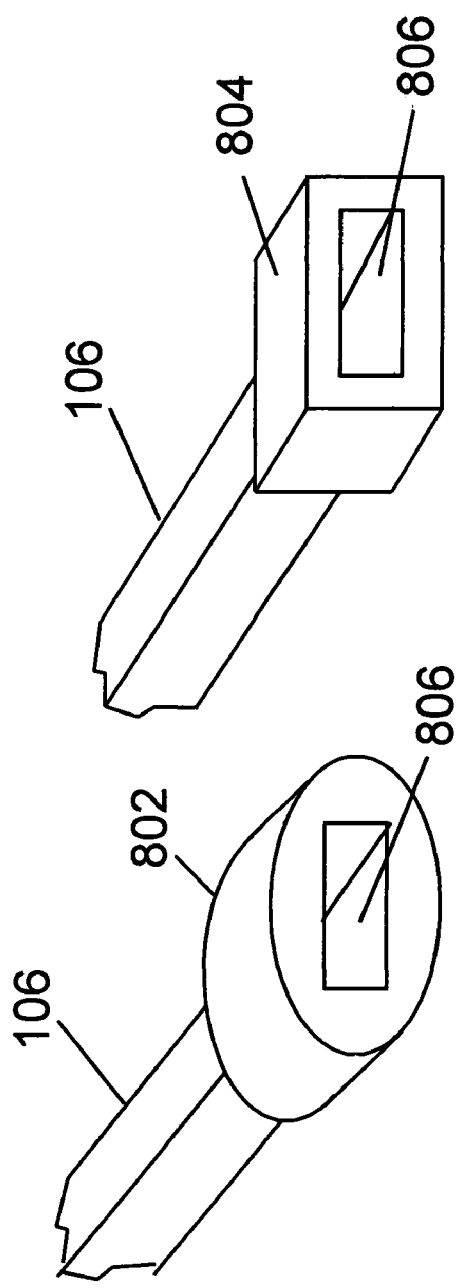
Fig. 8A
Fig. 8B
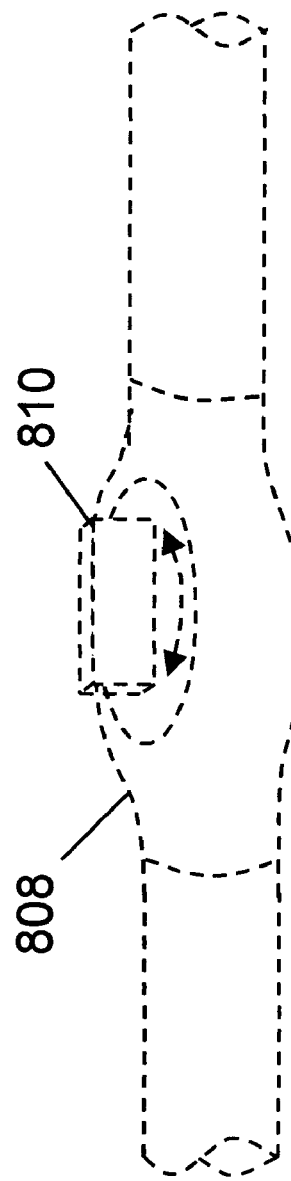
Fig. 8C

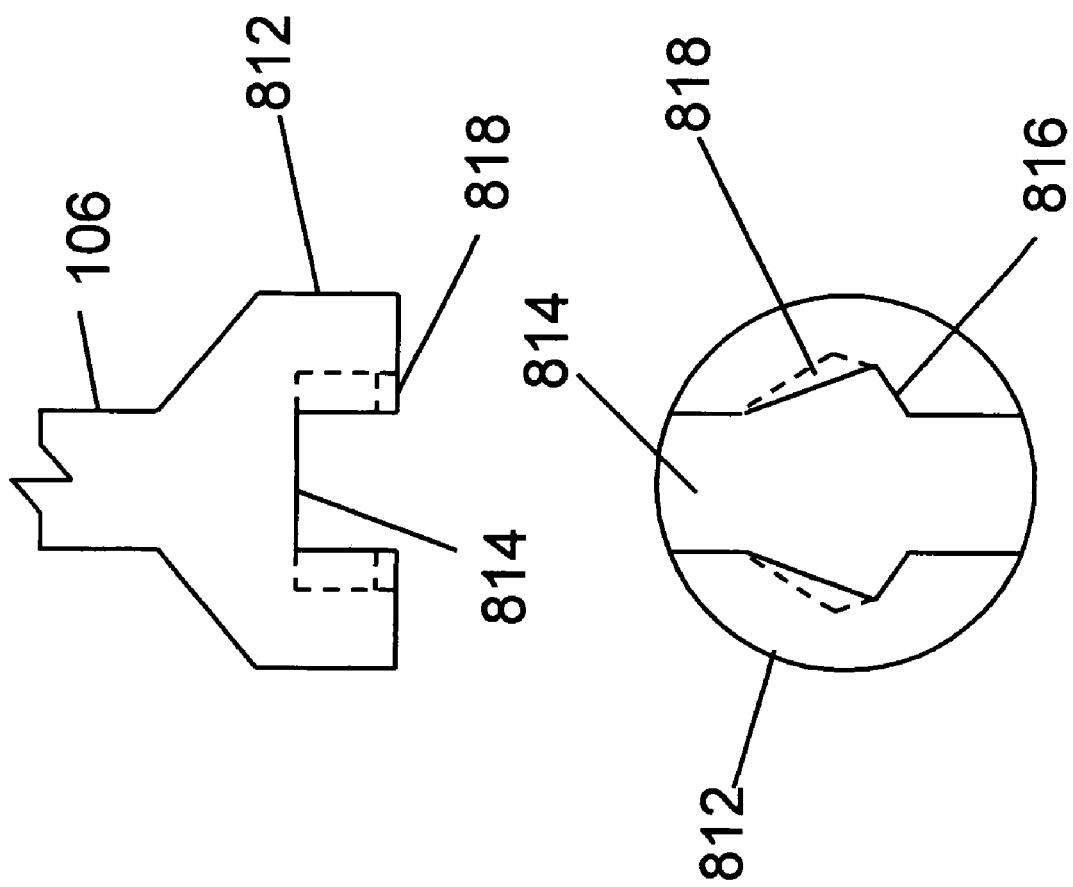

APPARATUS AND METHOD FOR OPERATING A WATER VALVE

BACKGROUND

1. Field of the Invention

The present invention pertains generally to the field of hand tools, more particularly, to hand tools having an extensible or collapsible handle for use in operating water valves typically associated with water meters.

2. Background of the Invention

The present invention is a wrench particularly adapted for the operation of an underground water valve of the type typically used in conjunction with a water meter for residential water service. Wrenches for water meter valves are known in the art and are typically called: water valve wrenches, water meter wrenches, street keys, water tee wrenches, or water valve keys or other similar terms. A typical water meter wrench comprises a steel shaft and handle with an end, opposite the handle, adapted to turn a lug or tab on the water meter valve to operate the valve. Water meter valves are usually located in access boxes or man holes that present awkward or inconvenient configurations for operation using more common wrenches or pliers. Thus, a water valve wrench is the preferred tool for the professional or homeowner for operating such valves. A water valve wrench, however, is infrequently used by the homeowner or professional, except for a select few in the water department whose sole task is to turn on or off service to customers. Existing water valve wrenches, however are large and take considerable space in a toolbox, tool room or service truck. Since valve wrenches are infrequently used, they are likely to be left back at the shop, leaving the service professional to make do with less appropriate tools. Thus, there is a need for a compact, convenient, and economical water valve wrench that may be carried on a vehicle or kept in a toolbox without occupying excessive space, yet the wrench should be economical enough for the homeowner who has infrequent, but often acute need for such a wrench when a pipe breaks or other service is needed.

BRIEF DESCRIPTION OF THE INVENTION

The present invention is a valve wrench with a telescoping shaft and foldable handle that enable the wrench to be stored in a compact manner, packing efficiently with related tools and materials used in the industry.

The valve wrench comprises a telescoping shaft assembly further comprising an inner shaft and an outer shaft, a handle pivotally attached to a first end of the shaft assembly, and a valve coupling element fixed or mounted on a second end. The inner shaft may include a spring loaded button that engages the outer shaft to hold the inner and outer shaft in an operation position or alternatively in a storage position. The handle pivots to form a compact linear assembly in a storage configuration and is shaped conformal to the telescoping shaft to minimize occupied space in the storage configuration. The inner and outer shafts may be constructed from a number of complementary cross section shapes including rectangular, hexagonal, and spline to assist in the transfer of torque from the handle to the valve. A number of alternative valve coupling elements are provided for different valves. A method for using the valve wrench is also disclosed.

These and further benefits and features of the present invention will be described in detail with reference to exemplary embodiments in accordance with the invention.

BRIEF DESCRIPTION OF THE DRAWINGS

The invention is described with reference to the following drawings. In the drawings, like numbers represent identical or similar components. The first digits of a reference number identify the drawing number wherein the reference first appears.

FIG. 8A shows an alternative valve coupling element;

FIG. 8B shows an alternative valve coupling element;

FIG. 8C (not part of the invention) shows a typical water meter valve operated by the present invention;

FIG. 8D is a side view of an alternative work coupling element;

FIG. 8E is a bottom view of the alternative work coupling element of FIG. 8D.

DETAILED DESCRIPTION OF THE PREFERRED EMBODIMENTS

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Figure 1:
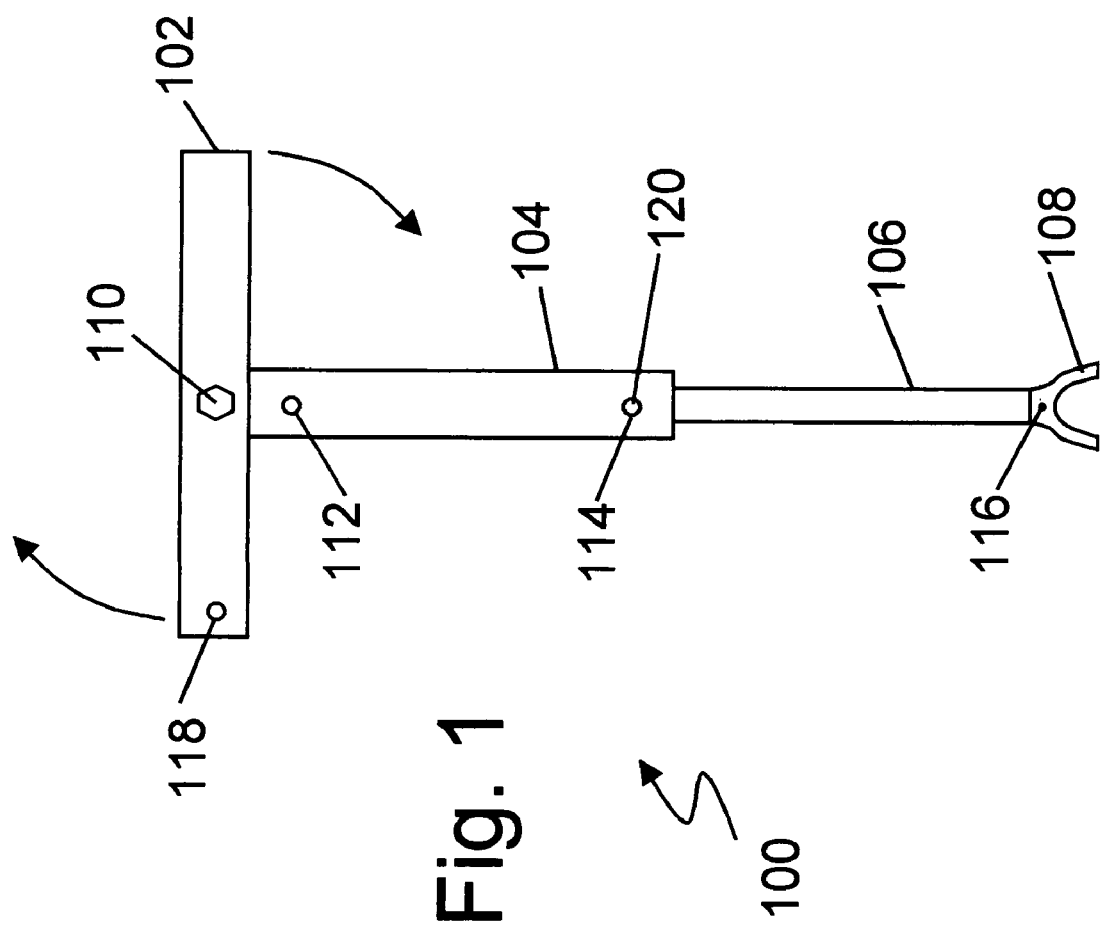
FIG. 1 illustrates an exemplary embodiment of a valve wrench shown in the operational configuration.

FIG. 1 illustrates an exemplary embodiment of a valve wrench 100 shown in the operational configuration. Referring to FIG. 1, the valve wrench 100 comprises a handle 102, a telescoping shaft further comprising an outer shaft 104 and an inner shaft 106, and a work coupling element 108, or more specifically, a valve coupling element 108.

The valve wrench 100 shown in FIG. 1 permits operation of a valve located below grade in a utility box or manhole, yet allows the operator to remain above grade in a comfortable standing or kneeling position. The valve wrench 100 collapses to a compact linear bar form factor of nearly half the operating length for efficient storage in a tool box or workshop or among miscellaneous articles carried on a service truck. Further, the construction of the wrench is simple, potentially utilizing component materials in readily available shapes and sizes, thus reducing costs and enabling the valve wrench 100 to find wide application and deployment.

A full length prior art valve wrench presents storage difficulties and limits storage possibilities. The prior art handle is prone to catching or snagging on other tools or materials and the length prohibits storage in many toolboxes. The telescoping shaft of the present invention, however, enables the valve wrench 100 to fit inside a toolbox for convenient carrying and efficient organization of tools. The folding handle 102 gives the wrench a linear bar form factor that will not get caught under other storage items or tangled with wires, making the storage efficient and trouble free. The same features that facilitate storage for the end user also facilitate inventory storage and minimize shelf space required in the manufacturing and retail operations for the valve wrench 100, further lowering costs to the consumer and improving availability to the consumer by making the tool more attractive to retail managers.

In one embodiment, the wrench may be constructed utilizing square bar and square tubular steel in readily available standard sizes, reducing costs and facilitating manufacture. Further, the valve wrench 100 may be easily constructed of heavy material to sustain the rough treatment and deliver the high torque expected of professional tools.

Due to the unique properties of the invention, the valve wrench 100 of the present invention presents a more rugged form factor than the prior art full length tool. Not only does the folding handle 102 reduce snags that may result in damage to the valve wrench 100, but the collapsing shaft reduces the exposure and bending moment of a potentially damaging encounter. The smaller wrench profile presents a smaller target, less likely to be in the path of a heavy falling object or other accident. The smaller bending moment results from the shorter length. The bending moment advantage may be further illustrated by an example. The valve wrench 100 may be on the floor with the two ends resting on objects supporting the valve wrench 100 at the ends with nothing supporting the middle. If a 220 lb (100 kg) workman steps on the middle of the tool, the tendency to bend the valve wrench 100 depends on the strength of the valve wrench 100 and the moment arm, i.e., the distance from the workman's foot to the support at the end of the valve wrench 100. Since the valve wrench 100 of the present invention is roughly half the length (when in storage configuration), the maximum moment arm is also reduced by roughly half, reducing the tendency to bend.

In a further advantage, since the telescoping shaft is compounded in the storage configuration, the wrench has the compound strength of both shafts available to resist damage; i.e. since the inner shaft 106 is fully retracted inside the outer shaft 104, both shafts work together to resist bending. (To fully realize this benefit, the two shafts should fit close enough so that the outer shaft 104 will not be damaged before engaging the inner shaft 106.) Not only is the bending moment nearly half, the strength is nearly doubled, resulting in a greatly improved resistance to damage.

In one embodiment, the tool includes a push button locking snap to secure the tool in either the operation or storage configuration and allow changing the configuration without the use of additional tools such as wrenches or screwdrivers.

Referring again to FIG. 1, the handle 102 comprises a length of U shaped channel steel that is pivotally attached to the outer shaft 104 using a bolt 110. The bolt 110 is tightened snugly to the handle 102, but clearance is allowed between the handle 102 and outer shaft 104 to allow the handle 102 to pivot freely, permitting the handle 102 to rotate to a position parallel to the outer shaft 104. A hanger hole 118 is provided in the handle 102 to allow the valve wrench 100 to be hung by a nail or hook in a workshop or storage area. The compact linear shape of the valve wrench 100 allows efficient storage in this manner.

The inner shaft 106 comprises a square bar dimensioned to slide freely inside the outer shaft 104 in a telescoping manner, yet sufficiently close fitting to receive torque input from the outer shaft 104 without slipping or binding. The inner shaft 106 includes a locking mechanism to hold the position of the inner shaft 106 relative to the outer shaft 104 in both the operation configuration and in the storage configuration. The locking mechanism comprises a spring loaded button 120 located in the inner shaft 106 that locates and locks in one of two holes 112, 114 provided in the outer shaft 104. A storage latch hole 112 is provided in the outer shaft 104 for the storage configuration and an operation latch hole 114 is provided for the operation configuration. The button 120 may be depressed with a finger, allowing the inner shaft 106 to slide within the outer shaft 104 to change configurations. When the alternate configuration is reached, the button 120 will snap into place and hold that alternate configuration. In a further embodiment, multiple holes are provided in the outer shaft 104 to allow different operating lengths of the valve wrench 100.

As shown in FIG. 1, the inner shaft 106 and outer shaft 104 have a square cross section, however, any suitable cross section may be used. It is advantageous to use matching cross sections for the inner surface of the outer shaft 104 and the outer surface of the inner shaft 106 to allow both axial sliding from the operating configuration to the storage configuration, and to transfer torque in the operating configuration. Thus hexagonal, spline, triangular and other cross sections may be used. A round section could be used with a keyway or other torque transfer means, but other sections are preferred. Note also the cross section need not be uniform for the whole length. For example, in the embodiment shown in FIG. 1, only a small length of the inner shaft 106 need be square to transfer torque and maintain alignment for the button 120. The remaining inner shaft 106 length may be round or any other cross section that fits within the outer shaft 104. Also, the inner shaft 106 need not be solid, but may be tubular to save material and lighten the weight of the valve wrench 100.

The valve coupling element 108, is affixed to the end of the telescoping shaft opposite the handle 102. In one embodiment, a V or U shaped section as shown in FIG. 1 is used to couple to a control tab on a typical water meter valve. The vertex of the v is attached to the telescoping shaft and the open end of the V is used for coupling to the valve.

In one embodiment, the work coupling element 108 is formed or welded to the inner shaft 106. Alternatively, the work coupling element 108 is attached with a bolt or setscrew 116. In a further alternative, the work coupling element 108 is snapped in place with, for example, a spring loaded ball with friction detent to allow changing the work coupling element 108.

Figure 2:
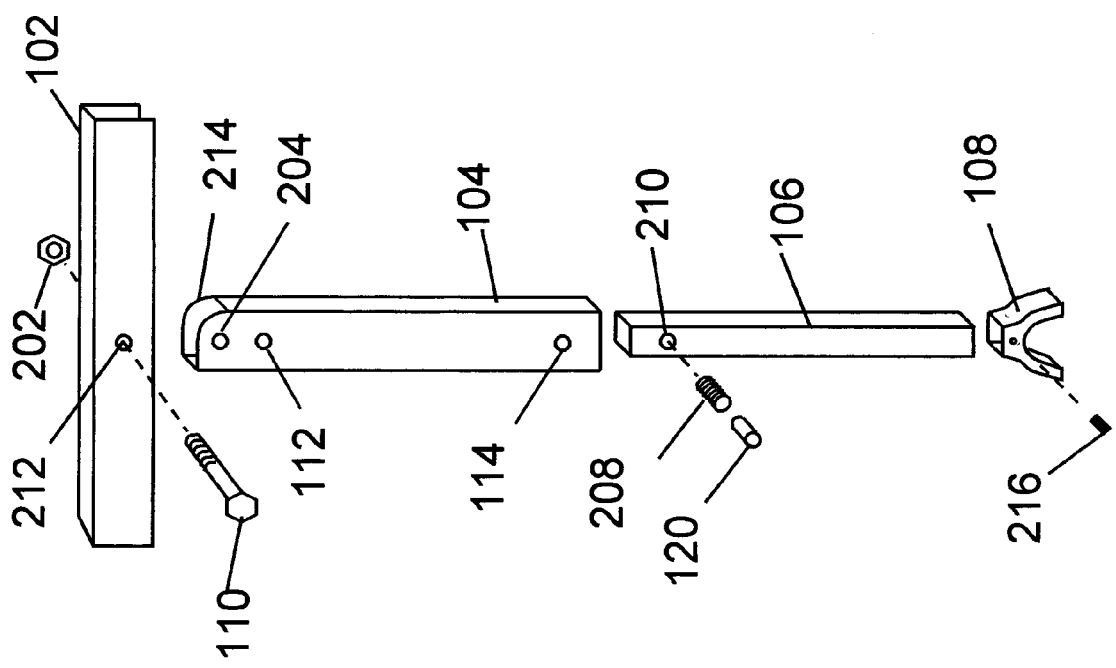
FIG. 2 is an exploded view of the embodiment of FIG. 1 showing the various component parts.

FIG. 2 is an exploded view of the embodiment of FIG. 1 showing the various component parts. The handle 102 is attached to the outer shaft 104 using a bolt 110 and nut 202. A handle pivot hole 212 for receiving the bolt 110 is placed near the center of the handle 102. The outer shaft 104 comprises a length of square tubing having a shaft pivot hole 204 through two opposite sides of the tubing for receiving the pivot bolt 110. Other forms of attachment such as a rivet or hinge may be used. Note that one side of the outer shaft 104 is rounded 214 to allow the handle 102 to fold down on that side. The other side is flat to provide support for the handle 102. Alternatively both sides may be dimensioned (e.g., rounded 214) to allow folding of the handle 102. The inner shaft 106 includes a spring loaded button 120 mechanism comprising a button 120, a spring 208 and a button recess 210 to receive the button 120 and spring 208. The button 120 is held in the button recess 210 by crimping or swaging the opening. Alternate methods may be used for holding the button 120. Alternate locking mechanisms may be used as well, such as a friction detent, collet or other device. The work coupling element 108 is attached to the inner shaft 106 using a setscrew 116 as shown in FIG. 2. Alternate attachment methods may be used as have been discussed.

In an alternative embodiment (not shown), the inner shaft 106 and outer shaft 104 may be reversed, i.e., the inner shaft 106 may be adapted to be attached to the handle 102 and the outer shaft 104 may be adapted to be attached to the work coupling element 108.

In a further embodiment (not shown), multiple telescoping sections may be used for the shaft.

In one embodiment, the handle 102 has a length of 10 inches (25.4 cm), the outer shaft 104 and inner shaft 106 have a length of 16 inches (40.6 cm), the work coupling element 108 adds 2 inches (5 cm). The resulting operating length when extended is 31.5 in (80 cm). The resulting operating length when retracted is 19 inches (48.3 cm). The resulting storage length with handle 102 rotated parallel to body is 22.5 in (57.2 cm). The inner shaft 106 is 0.5 inch (1.27 cm) square. The outer shaft 104 and handle 102 are made from 0.1 inch (0.254 cm) thickness material. These dimensions are only roughly representative of an embodiment suited to water valve operation. The dimensions may be varied to cover a range of field requirements. For example, the length could be increased considerably to allow operation of valves in deep manholes. Likewise the length could be shorter and materials thinner and lighter to fit in a smaller toolbox.

Figure 3:
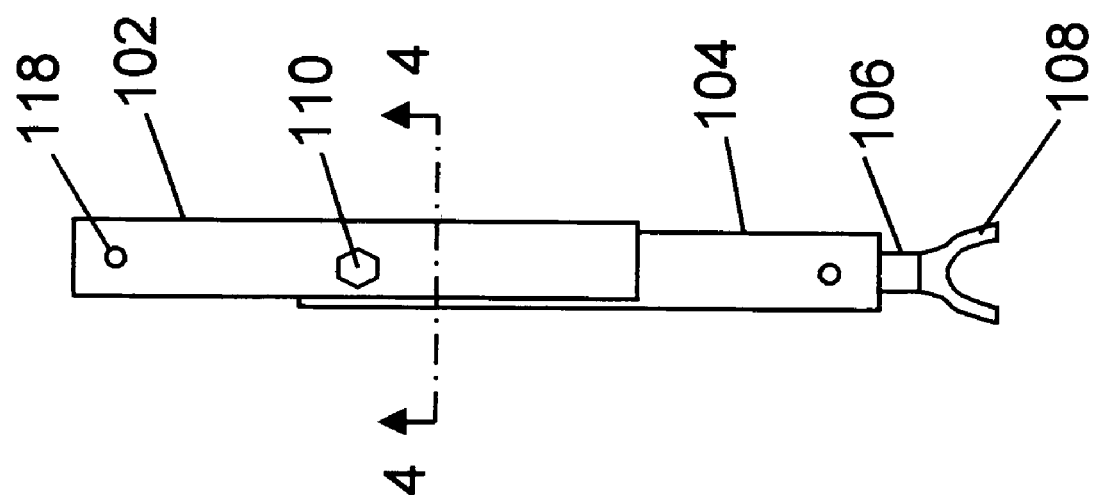
FIG. 3 illustrates the storage configuration of the valve wrench shown in FIG. 1.

FIG. 3 illustrates the storage configuration of the valve wrench 100 shown in FIG. 1. Referring to FIG. 3, the handle 102 is folded parallel to the shaft axis and the inner shaft 106 is fully retracted inside the outer shaft 104, resulting in a clean and linear bar shaped form factor having minimal protrusions subject to damage in a storage situation such as the back of a service truck or in a tool box.

Figure 4:
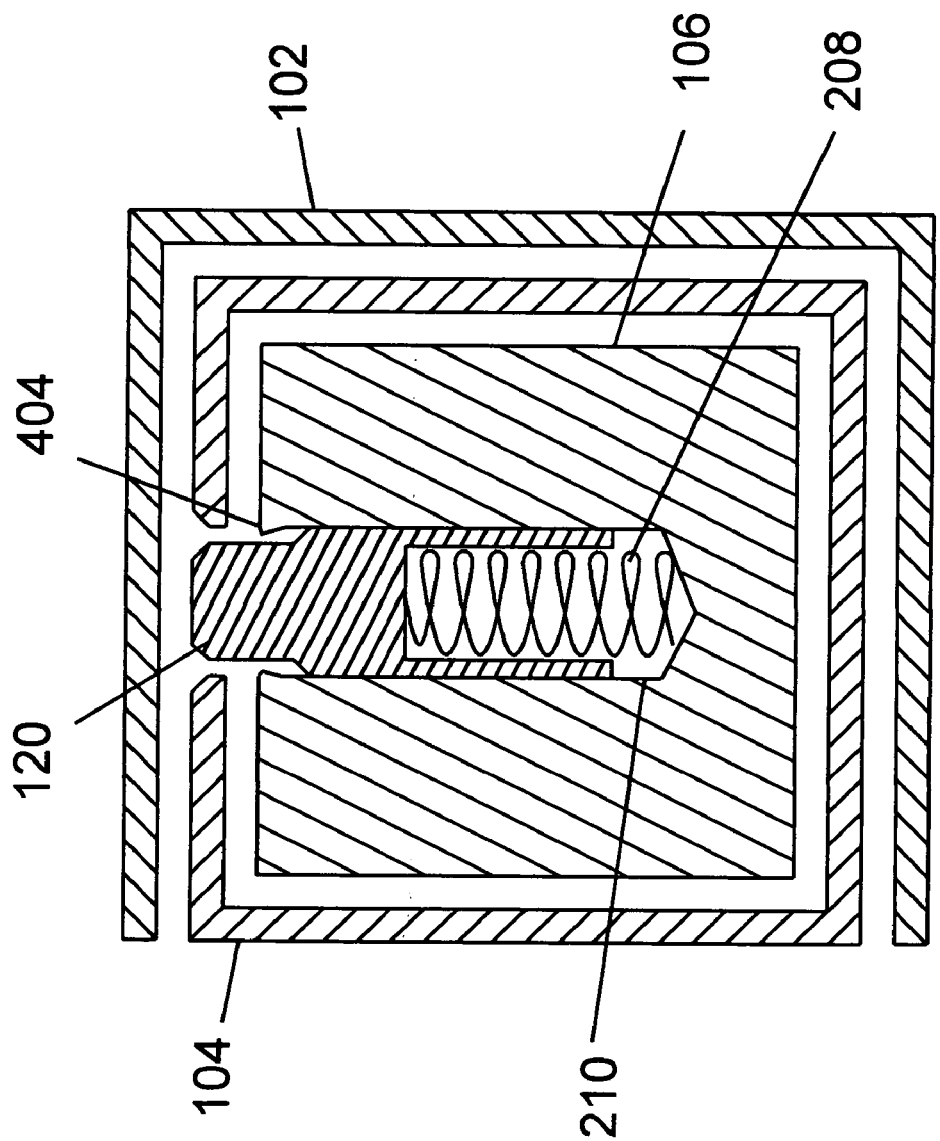
FIG. 4 is a section view of the storage configuration including the locking button as shown in FIG. 3.

FIG. 4 is a section view of the storage configuration including the locking button 120 as indicated in FIG. 3; Referring to FIG. 4, the U shaped cross section of the handle 102 is seen to wrap conformally, i.e., close to, the outer shaft 104 for best compact form in the storage configuration. The close, but free fitting square cross section inner shaft 106 is located inside the outer shaft 104.

The locking button 120 is installed in the button recess 210 in the inner shaft 106. The locking button 120 is spring loaded to force the button 120 into one of the latching holes 112, 114 in the outer shaft 104, thereby locking the inner shaft 106 and outer shaft 104 in a fixed relative position. The button 120 is freely sliding for a distance inside the recess. The opening of the button 120 recess may be swaged 404 slightly to keep the button 120 inside the button recess 210 to prevent loss of the button 120 if the inner shaft 106 and outer shaft 104 become separated.

Figure 5:
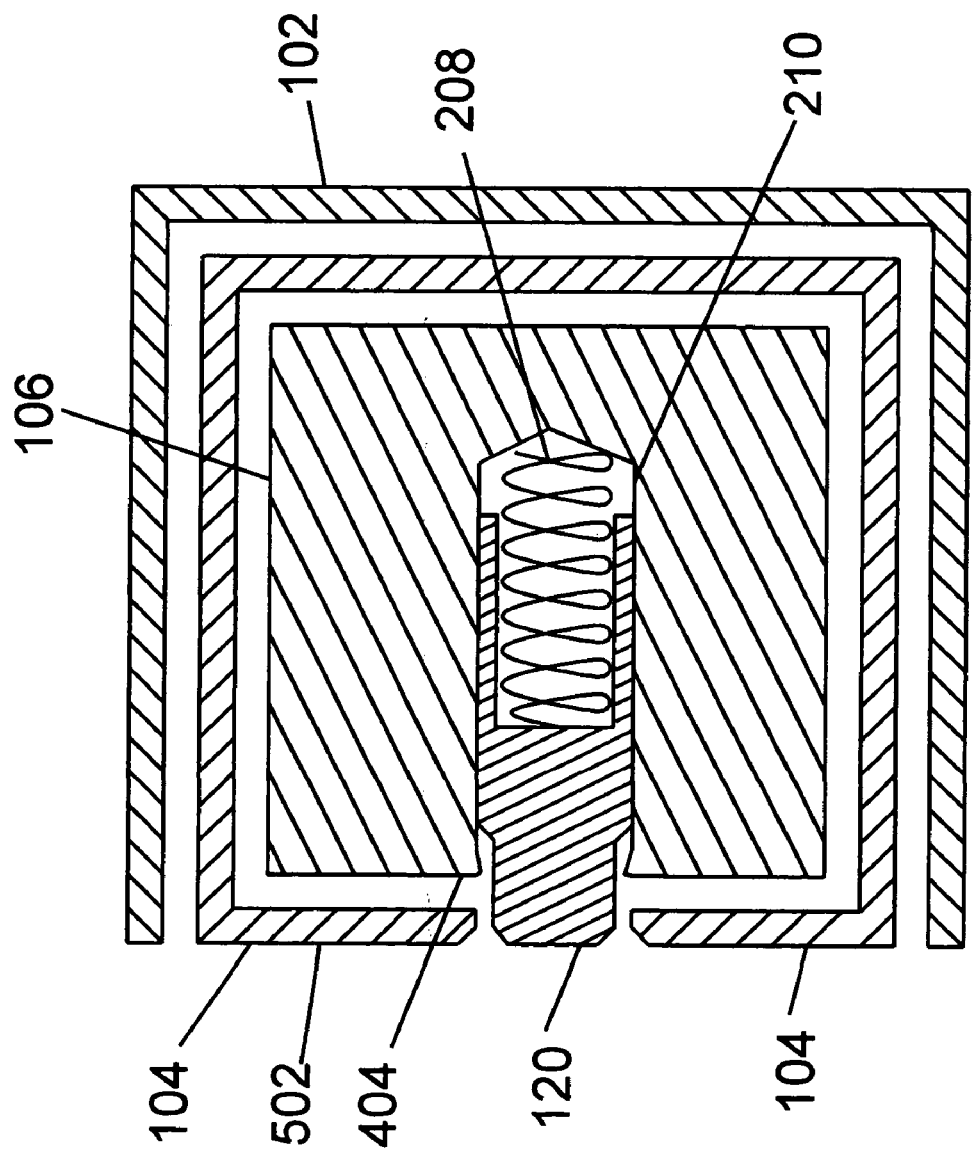
FIG. 5 is a section view of the storage configuration including an alternate locking button arrangement.

FIG. 5 is a section view of the storage configuration including an alternate locking button 120 arrangement; Referring to FIG. 5, the locking button 120 is placed on the open side 502 of the telescoping shaft that is not covered by the handle 102 when the handle 102 is folded in the storage configuration.

Figure 6:
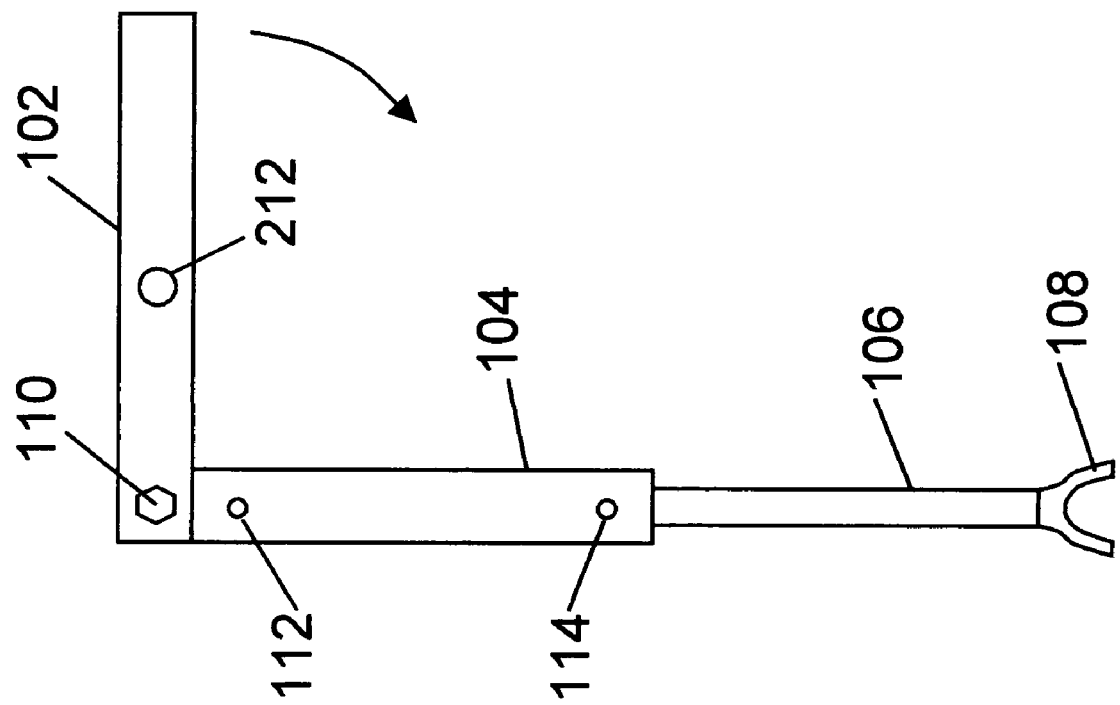
FIG. 6 is an alternative embodiment of the invention wherein the shaft and handle form an L shape.

FIG. 6 is an alternative embodiment of the invention wherein the shaft and handle 102 form an L shape. Referring to FIG. 6, the embodiment shown in FIG. 6 is similar to the embodiment shown in FIG. 1 except that the handle 102 is attached near the end of the handle 102 rather than near the middle of the handle 102 as in FIG. 1. The advantage of the L shape embodiment is that the total length of the storage configuration is reduced because the handle 102 does not protrude beyond the end of the telescoping shaft assembly when the handle 102 is folded down in the storage configuration. A second set of holes 212 may be provided in the handle 102 to allow the valve wrench 100 to be configured in either the T handle 102 configuration as in FIG. 1 or the L handle 102 configuration as in FIG. 6 by removing the bolt 110 and re-installing the bolt 110 in the appropriate set of holes.

Figure 7:
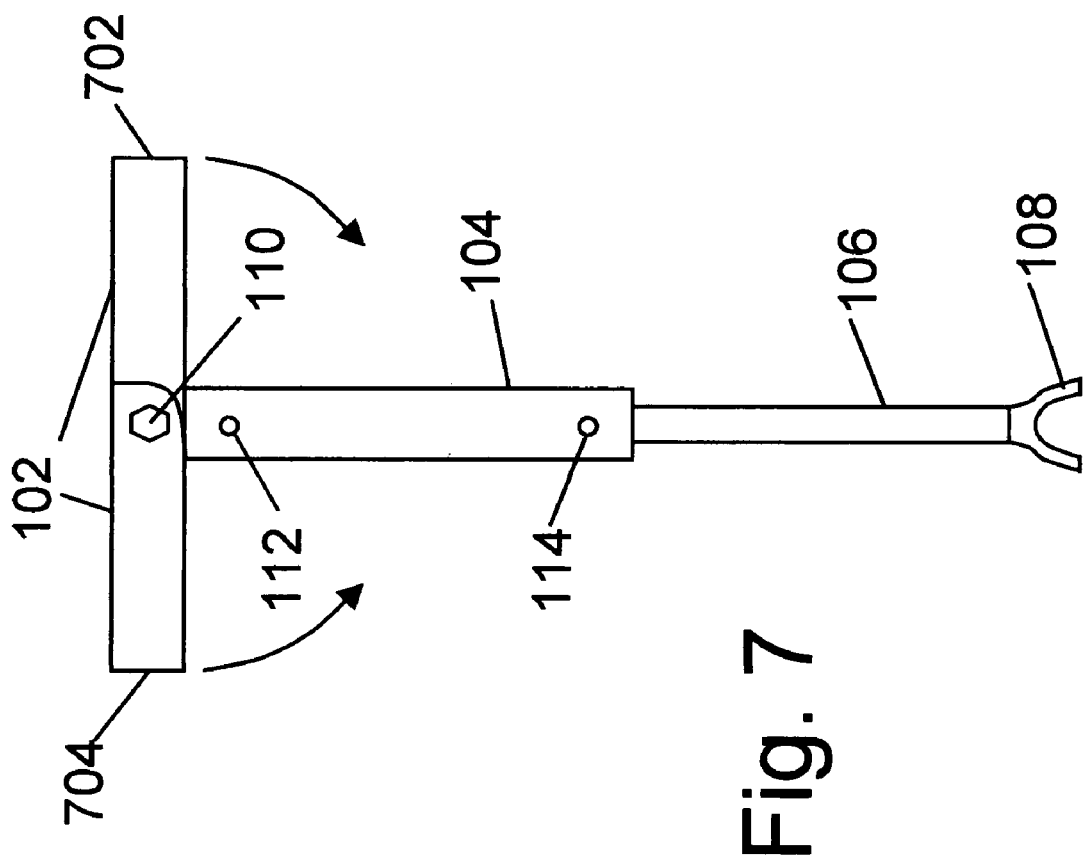
FIG. 7 shows a two part handle embodiment of the invention.

FIG. 7 shows a two part handle 102 embodiment of the invention. Referring to FIG. 7, the handle 102 comprises two parts, a first arm 702 and a second arm 704. Each arm is pivoted on the bolt 110 such that each part of the handle 102 may be folded down to the outer shaft 104 for storage as indicated by the arrows in FIG. 7.

FIG. 8A shows an alternative valve coupling element 108. FIG. 8A and FIG. 8B are described with reference to FIG. 8C. FIG. 8C shows an exemplary water valve including a valve body 808 and control tab 810.

Referring to FIG. 8A, the valve coupling element 108 is shown attached to the end of the inner shaft 106. The valve coupling element 108 comprises an elliptical or oval body 802 with a rectangular coupling recess 806 for receiving the control tab 810 on the valve. When the valve wrench 100 is positioned such that the valve control tab 810 is inserted into the end of the valve coupling element 108, rotation of the valve wrench 100 will be coupled to the valve, enabling adjustment of the valve. The valve coupling element 108 of FIG. 8A fully surrounds the valve control tab 810 to prevent the valve coupling element 108 from slipping off of the control tab 810.

FIG. 8B shows an alternative valve coupling element 108. Referring to FIG. 8B, the valve coupling element 108 is shown attached to the end of the inner shaft 106. The valve coupling element 108 comprises a rectangular body 804 having a rectangular cross section with a rectangular coupling recess 806 for receiving the tab 810 on the water valve. When the valve wrench 100 is positioned such that the valve control tab 810 is inserted into the end of the valve coupling element 108, rotation of the valve wrench 100 will be coupled to the valve, enabling adjustment of the valve.

Further alternative work coupling elements 108 may be utilized in accordance with the teachings of the present invention to adapt to different valves including such valves as gas valves.

FIG. 8C (not part of the invention) shows a typical water meter valve operated by the present invention. FIG. 8C shows a valve body 808 with a rectangular control tab 810 for adjusting the flow. The valve wrench 100 of the present invention may be coupled to the control tab 810 to rotate the control tab 810 to control the flow through the valve.

FIG. 8D is a side view of an alternative work coupling element 108. The work coupling element 108 of FIG. 8D comprises a round body 812 connected to the inner shaft 106, a notch 814 for coupling to a valve, and a recess 816 configured to receive and operate a five sided bolt as is typically used on water meter access covers. Also shown is a lip 818 to allow lifting the access cover by capturing the five sided bolt head under the lip 818 and lifting the access cover.

FIG. 8E is a bottom view of the alternative work coupling element 108 of FIG. 8D.

The operation of the valve wrench 100 will now be described. To operate the wrench, the inner shaft 106 is extended by pressing the locking button 120 and pulling the inner shaft 106 out to full extension. When full length is reached, the button 120 will snap outwardly and engage the extension hole in the outer shaft 104, locking the tool in the operating configuration. The handle 102 is then unfolded to a perpendicular orientation relative to the shaft. The tool is coupled to the valve tab 810 by inserting the valve tab 810 into the work coupling element 108 portion of the tool whereupon the handle 102 may be rotated to operate the valve. Alternatively, the tool may be operated without extending the inner shaft 106 to full extension length.

Figure 9:
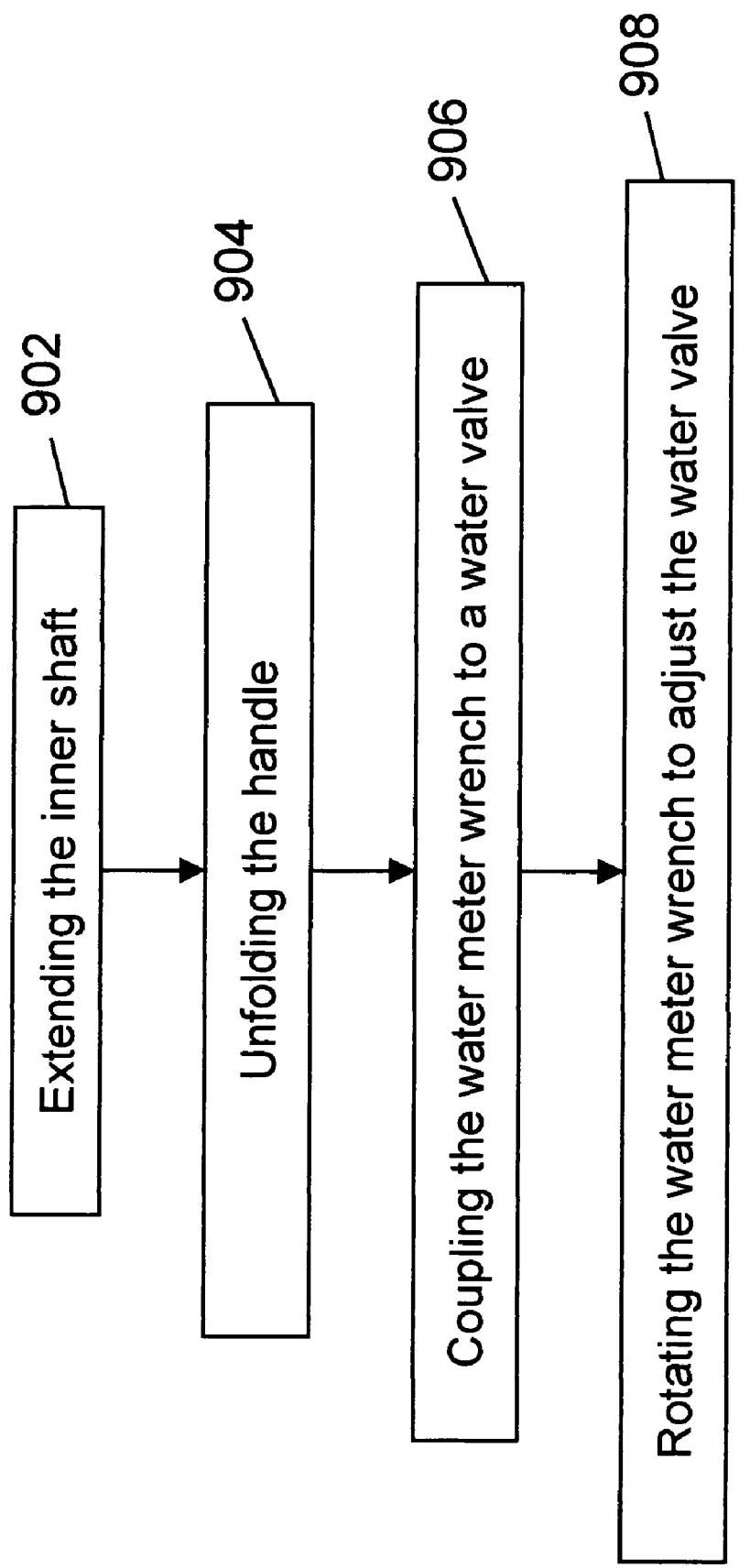
FIG. 9 shows a method for using the valve wrench.

FIG. 9 shows a method for using the valve wrench 100 of FIG. 1. The steps comprise: extending the inner shaft 106, 902; unfolding the handle 102, 904; coupling the water meter wrench to a water valve 906; and rotating the water meter wrench to adjust the water valve 908. The steps of extending the inner shaft 106, 902 and unfolding the handle 102, 904 may be performed in any sequence; however, it may be easier to extend the inner shaft 106 902 while gripping the water meter wrench with the handle 102 folded around the outer shaft 104. Note that the handle 102 may cover the button 120 in the storage configuration as shown in FIG. 3. If it is desired to operate the button 120 with the handle 102 folded, the button 120 should be located on the side not covered by the handle 102 or an alternate locking method may be utilized.

CONCLUSION

While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements which embody the spirit and scope, of the present invention.

What is claimed is:

1. A device for operating a valve comprising:
   at least one handle pivotally attached to a first shaft for rotationally driving said first shaft, said handle pivoting from a first position perpendicular to said first shaft to a second position parallel to said first shaft;
   a second shaft slidable in a telescoping arrangement with said first shaft and rotationally coupled to said first shaft; and
   a valve coupling element attached to said second shaft for coupling rotational motion from said handle to said valve.

2. A device as in claim 1 wherein said handle is attached to said first shaft at the center of the length of said handle.

3. A device as in claim 1 wherein said handle is attached to said first shaft at one end of the length of said handle.

4. A device as in claim 1 wherein said first shaft is the outer shaft and said second shaft is the inner shaft in said telescoping arrangement.

5. A device as in claim 4 wherein at least part of the length of said inner shaft has a cross section forming one of the set including a rectangle, triangle, hexagon, and spline.

6. A device as in claim 5 wherein said rectangle is a square.

7. A device as in claim 1 wherein said valve coupling element is attached to said second shaft by welding.

8. A device as in claim 1 wherein said valve coupling element is removable from said second shaft.

9. A device as in claim 1 wherein said valve coupling element includes a substantially rectangular recess for coupling to a valve.

10. A device as in claim 1 wherein said valve coupling element is V shaped wherein the vertex of said V is attached to said second shaft and the open portion of said V is for coupling to said valve.

11. A device as in claim 1 further including a locking mechanism for locking said first shaft and said second shaft in a fixed relative position.

12. A device as in claim 11 wherein said locking mechanism comprises a spring loaded button located in said second shaft.

13. The device as in claim 1, wherein the first shaft is a straight bar shape having a hollow center for receiving said second shaft and holes for attaching said handle and locking the position of said second shaft.

14. The device of claim 1, wherein at least a portion of said handle is conformally shaped to fit around said first shaft when pivoted to the storage position.

15. A method for operating a valve comprising the steps of:
   1) providing a valve wrench, said valve wrench comprising a foldable handle coupled to a telescoping shaft, said telescoping shaft having a telescope locking device and a valve coupling element attached thereto; said valve wrench initially in a storage configuration; said storage configuration characterized by said foldable handle folded in a position parallel to said telescoping shaft and said telescoping shaft collapsed in length;
   2) releasing said telescoping shaft locking device from said storage position;
   3) extending said telescoping shaft to an extended position;
   4) locking said telescoping shaft in said extended position;
   5) unfolding said handle to a position perpendicular to said telescoping shaft;
   6) coupling said valve wrench to said valve; and
   7) rotating said valve wrench to adjust said valve.

* * * * *